United States Patent [19]

Fischer

[11] 4,120,039

[45] Oct. 10, 1978

[54] ELECTRONIC DIGITAL WATCH COMBINED WITH A COMPUTER

[76] Inventor: János Fischer, Feldblumenweg 22, Zurich, Switzerland

[21] Appl. No.: 806,372

[22] Filed: Jun. 14, 1977

[30] Foreign Application Priority Data

Jun. 25, 1976 [CH] Switzerland ........................ 8129/76

[51] Int. Cl.[2] ........................ G06F 3/02; G06F 15/02; G04B 19/30

[52] U.S. Cl. .................................. 364/705; 58/50 R; 58/152 R; 200/5 A; 364/709

[58] Field of Search ............... 235/152, 156; 200/5 A; 307/116, 125; 340/365 R, 365 C, 365 E, 365 S; 58/50 R, 152 R; 364/705, 709

[56] References Cited

U.S. PATENT DOCUMENTS

| | | | |
|---|---|---|---|
| 3,803,834 | 4/1974 | Reese | 58/152 R |
| 3,940,758 | 2/1976 | Margolin | 200/5 A X |
| 3,955,355 | 5/1976 | Luce | 235/156 X |
| 3,973,255 | 8/1976 | Freeman | 340/365 C X |
| 3,981,757 | 9/1976 | Larson | 200/5 A X |

*Primary Examiner*—Jerry Smith
*Attorney, Agent, or Firm*—Watson, Cole, Grindle & Watson

[57] ABSTRACT

The keyboard for the computer portion of a combined electronic digital watch - computer device is hinged so as to be foldable into either a useable mode or a non-accessable mode, and the individual keys include triggers extending upwardly from the bottom of an elongated depression formed by surrounding side walls, the triggers being positioned eccentrically within the depression.

4 Claims, 5 Drawing Figures

ELECTRONIC DIGITAL WATCH COMBINED WITH A COMPUTER

BACKGROUND OF THE INVENTION

1. Field of the Invention

The invention relates to an electronic digital watch combined with a computer which has a common recording field for both the computer and the watch.

2. Description of Prior Art

A known digital watch with computer which is obtainable e.g., under the tradename of "Pulsar", has a keyboard for the computer; however, the keys are so miniaturized in size and lie so closely together that they can be operated only with the aid of a pin. The advantage of the compact construction of such a computer watch, which has been conceived especially as a wrist watch, is opposed by the disadvantages that for the operation of the computer, a separate auxiliary instrument (pin) is required for the operation of the computer, and that a considerable accuracy in hitting is assumed for the user. The actual purpose of a wrist watch equipped with a computer involves the availability of an easily, safely and reliably operable computer for as many operations as possible, and which is constructed such that keying mistakes can be always avoided. The known digital watch thus, because of the needed auxiliary implement and the inaccuracy in hitting, has fulfilled only conditionally the purposes for which it is intended.

In order to decrease the size of electronic pocket computers, it has been known (e.g., see U.S. Pat. No. 3,940,758 to MARGOLIN; IBM Technical Disclosure Bulletin, Vol. 10, No. 3, August 1967 article entitled "Wallet Terminal Keyboard with Acoustic Coupler" by M. F. Davis, Jr. and R. H. Koepf) to form the keyboard from modular sections which can be folded on top of one another, whereby each section for the keys has a large number of traditional, essentially square or round pressure keys which have a sufficient size for operating with a person fingers and which are equipped on the support surface for the finger with the designation of the function of the key. The combination of such a computer with a digital watch would be usable possibly for a computer with only a few keys, since in the case of a predetermined size of the watch and of many keys, too many keyboard sections would have to be placed one on top of the other. It is true, however, that the operational safety of the computer would be guaranteed.

Furthermore, so-called diaphragm switches are also known which may be combined into key sets, especially for electronic computers. In the case of such a keyboard (e.g., see French Pat. No. 7,001,611 to BREVATOME) contacts have been disposed in the fields of a screen supported by a bottom. On the screen is a diaphragm which on its part again is covered up with an insulating screen. Each screen element thus forms a membrane switch, whereby the screen element has a sufficient size so that always the membrane of only one switch is forced (pressed) onto the contact with the finger. A miniaturization of such a diaphragm switch is conditional in turn on the use of an auxiliary device, e.g. a pin.

In an article in ELECTRICAL DESIGN NEWS. Vol. 18, No. 8, April 1973, pp 25 and 26, entitled "Power-Supply Modification Turns Standard Calculator Chip into Unique Product", a keyboard is shown, each key of which is developed as a trigger and is disposed in the middle of a square field. The edging of the keyboard facilitates so to speak the aiming at the individual small triggers; however, the distance between them must be sufficiently large that two adjacent triggers are not operated simultaneously with one press of a finger. For a satisfactory safety of operation, the frames around the triggers must therefore always encompass a sufficiently large surface area that in turn only relatively few keys could be accommodated on a keyboard section which is sufficiently small for a watch.

SUMMARY OF THE INVENTION

It is an object of the present invention to create an electronic digital watch combined with a computer which has a joint recording field for both the computer and the watch, and a keyboard for the computer which is subdivided in at least two sections that can be folded on top of one another, and which sections include keys structured in the form of triggers surrounded by edgings. A number of keys may be accommodated on each section of the keyboard of the computer, even though it be combined with a digital watch to form a unit no larger than a traditional wrist watch, and nevertheless the ease and safety of operation required for the computer is fully guaranteed without there being any need to use any kind of auxiliary implement for the operation of the keys.

According to the invention, computer includes numerous keys which each contain a trigger, each key being composed of a trigger disposed eccentrically within a concave recess and so as to project upwardly of the bottom of the recess, whereby the edge of the recess forms the edging around the trigger and the designation of function is provided on the bottom of the recess.

In the case of operation of a key constructed as noted, not the miniaturized trigger which can be almost invisible visible under certain circumstances, but the edging of the recess and the function sign located on the bottom of the recess is clearly observable, even in the case of weak illumination. Whenever a finger tip is placed so as to strike the selected recess, an inevitable alignment with the selected recess takes place as a result of the contacted edge of the recess, so that the finger will rest correctly on the selected recess in every case. Even in the case of only a slight pressure exerted by the finger, the finger tip will be deformed and the trigger lying in the recess will be operated. Adjacent recesses between keys need only be separated from one another by a relatively narrow bridge. Whenever the eccentrically disposed trigger lies in the adjacent recess close to the bridge, then the bridge will prevent this trigger from being operated along with the first one. The recesses may be selected small as compared to the size of a finger tip, without thereby impeding the safety of operation. Since the recesses on the keyboard section may be disposed lying closely side by side, a keyboard of a predetermined size which is equipped with keys according to the invention, in the case of a comparison with a corresponding keyboard which contains keys operable, e.g., by means of a pin, will have fewer keys to be sure, but it will be completely safe in operation, and in comparison to corresponding keyboard equipped with traditional, safe to operate, large surface keys, it will be just as safe to operate as the latter, but will be able to accommodate considerably more keys.

In a particularly favorable embodiment of the invention, the recess has an oblong shape, e.g., the shape of a rectangle with rounded corners, and the trigger is disposed in the recess displaced toward one narrow side of the recess. The size of the recess is then essentially determined by the size of the designation of the function. In the case of each keyboard section, the triggers are all preferably correspondingly positioned in the same location in the individual recesses.

Embodiments of the invention are shown in the attached drawing by way of example.

DETAILED DESCRIPTION OF THE PREFERRED EMBODIMENTS

Figure 1:
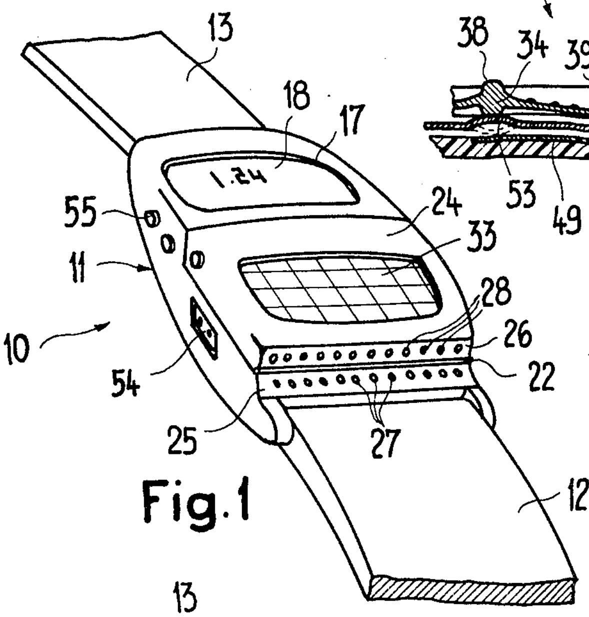
FIG. 1 shows in perspective presentation a digital watch combined with a computer, whereby the computer section is in an out-of-operation positioning.
Figure 2:
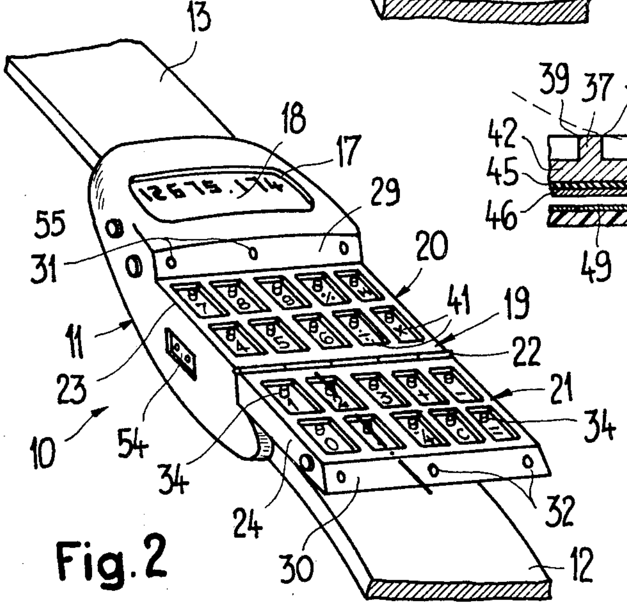
FIG. 2 shows the watch of FIG. 1 with the computer section in operational position.
Figure 5:
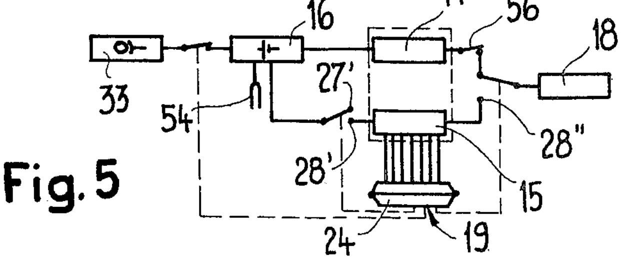

The digital watch with computer is generally shown as 10 in FIGS. 1 and 2, and includes a housing 11 to which the two ends 12 and 13 of a wrist band are connected. In the housing 11 is contained an electronic, crystal controlled "watch chip" 14 as well as a "computer chip" 15 (see FIG. 5), as well as possibly a current supply 16, such as a miniature built in lithium or mercury battery. The display field 18 with illuminating diodes (LED) or liquid crystal cells (LCD), operable with either the watch or the computer, is visible through a window 17.

A keyboard designated as a whole by 19 serves for the triggering of the computer chip 15. This keyboard is divided into two sections 20, 21 each having, for example, 10 keys, whereby the section 20 forms the bottom of a recess 23 in the housing 11, while the section 21 is disposed in a wing part 24 connected to the housing 11 by means of a hinge 22. The wing part 24 is shaped to fit precisely in recess 23 when hinged over onto section 20 and thus, as shown in FIG. 1, fits in its folded up position practically without gaps into the recess 23 of the housing 11.

The corresponding contacts 27, 28 disposed on abutting ends 25, 26 serve essentially for connecting the key contacts of the wing part 24 with the computer chip 15 accommodated in the housing 11.

An additional abutting surface 29 molded onto the housing 11 adjoins the bottom section 20 which abutting surface with an abutting surface 30 present at the free edge of the wing part 24. The abutting surfaces 29, 30 are each also provided with a set of corresponding contacts 31, 32, which among other things may serve for the purose of connecting the recording field with the watch chip 14 and to connect a photoelectric converter element 33, e.g., a so-called "solar cell" inserted in the side of the wing part 24 facing away from the key section 21, with the source of current 16 in order to keep the latter charged. It is obviously also possible to articulate sections of the keyboard inserted into the wing parts laterally to the housing, so that the keyboard may be opened in a manner of a two-winged door. In the case of non-use of the computer 10, the two sections

20, 21 remain facing each other on top of one another, such the keys are both hidden and protected from contamination, and the entire unit 10 assumes the shape of, say a wrist watch.

Figure 4:
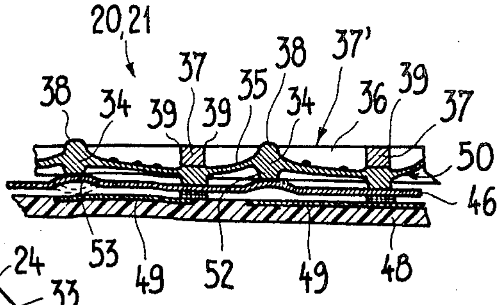
FIG. 4 shows a sectional view of a key arrangement in a second variation of, and FIG. 5 shows a very simplified block diagram by way of example of the electrical components of the digital watch shown in FIGS. 1 and 2.
Figure 3:
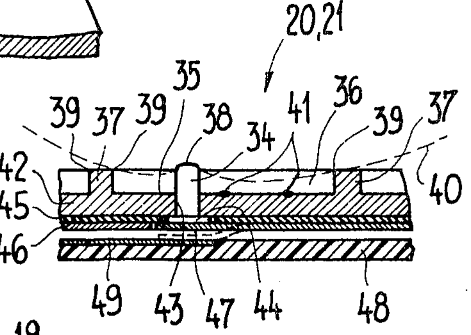
FIG. 3 shows a sectional view of a key arrangement in a first variation.

As shown in FIGS. 3 and 4, each "key" comprises a trigger 34 of the size of about a small pin head which projects from the bottom 35 of an elongated, e.g., rectangular, but preferably square, recess or depression 36. Each recess or depression 36 is defined by a plate 42 and side walls 37. The free end 38 of the trigger 34 projects from the top surface 35 of plate 42 and is rounded in shape, as can be seen from FIGS. 3 and 4, while the top edges of the side walls 37 always have a comparatively sharp edge 39 adjacent each depression 36. Moreover, the triggers 34 are positioned off center from the middle of the pertinent depression 36. Each trigger 34 is designated in more detail by a number or by a function symbol 41, each symbol being applied or engraved on the top surfaces 35 of the plate 42 in a size sufficient for good readability. Beneath plate 42 is an insulating layer 45, and beneath layer 45 is a contact spring plate 46 which includes contact tongues 47 (one contact tongue for each trigger 34). As can be seen from FIG. 3, upon the depression of trigger 38 by a finger (dashed line 40), the tongue 47 will be punched downwardly to contact printed conductor 49 on printed circuit board 48. Afterwards, due to resiliency of the tongue 47, it will spring back to its original positioning.

In FIG. 4, each depression 36 is defined by an insulating structure 50 (having a top surface 35) and side walls 37. The trigger 34 with rounded free end 38 and bottom portion 52 is formed as a part of the insulating structure 50. Beneath structure 50 in a contact spring plate 46 with oval snap contacts 53 positioned adjacent each bottom portion 52, and beneath plate 46 is a printed circuit board 48 with printed conductors 49 adjacent each snap contact 53. A crossbared cover plate 37' connects the various side walls 37. As shown in FIG. 2, the longer dimensions of the rectangular recesses 36 are aligned to be parallel with the wrist band in their longitudinal direction. Naturally, the alignment may also be transverse in relation to the wrist band.

I claim:

1. A combination electronic digital watch-computer device which includes a display field which is operable in conjunction with either the electronic digital watch portion of said device or the computer portion of said device;

said computer portion of said device including a keyboard which is divided into at least two sections, each being connected to an adjacent section by a hinge so as to be foldable on top of one another in a non-accessable mode or folded out away from one another into a useable mode;

the keyboard including a plurality of keys, each formed by side walls enclosing a depression, a bottom wall, and a vertically movable trigger means projecting upwardly into the depression from the bottom wall, the trigger means being positioned so as to be disposed eccentrically within the depression.

2. The device of claim 1 wherein the side walls forming each key are positioned to define a rectangularly-shaped depression, and wherein the triggers within each depression are eccentrically positioned to be closer to one of the shorter walls forming said rectangularly-shaped depression than the other.

3. The device of claim 1 wherein each trigger within each depression of each key is positioned within each depression in a corresponding fashion to every other trigger in every other depression.

4. The device of claim 1 wherein each key includes two spaced apart electrodes positioned beneath said bottom wall, wherein the end of said movable trigger opposite the end projecting upwardly into the depression is in contact with one of said two electrodes, and wherein upon pressing movement of said trigger towards said bottom wall said one of said two electrodes is caused to contact the second of said two electrodes.

* * * * *